United States Patent
Tsai (10) Patent No.: US 12,372,855 B2
(45) Date of Patent: Jul. 29, 2025

(54) PHOTOGRAPHY DEVICE

(71) Applicant: Chicony Electronics Co., Ltd., New Taipei (TW)

(72) Inventor: Pei-Sheng Tsai, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 161 days.

(21) Appl. No.: 18/503,198

(22) Filed: Nov. 7, 2023

(65) Prior Publication Data

US 2024/0219815 A1    Jul. 4, 2024

(30) Foreign Application Priority Data

Dec. 28, 2022    (TW) .................................. 111150497

(51) Int. Cl.
    *G03B 17/08* (2021.01)
    *G03B 17/56* (2021.01)
    *G08B 13/196* (2006.01)

(52) U.S. Cl.
    CPC ........... *G03B 17/08* (2013.01); *G03B 17/561* (2013.01); *G08B 13/19619* (2013.01)

(58) Field of Classification Search
    CPC .................... G03B 17/08; G08B 13/19619
    See application file for complete search history.

(56) References Cited

U.S. PATENT DOCUMENTS

| | | | |
|---|---|---|---|
| 5,077,597 A * | 12/1991 | Mishra | H01J 1/308 257/101 |
| 7,497,632 B2 * | 3/2009 | Kajino | H04N 23/51 348/373 |
| 7,699,691 B1 * | 4/2010 | Voigt | H05K 7/20154 165/104.33 |
| 8,964,042 B2 * | 2/2015 | Nozawa | H04N 23/6815 396/419 |
| 9,329,456 B1 * | 5/2016 | Sung | G03B 17/08 |
| 10,197,892 B2 * | 2/2019 | Nakano | H04N 23/56 |

FOREIGN PATENT DOCUMENTS

CN    114827417 A    7/2022

* cited by examiner

*Primary Examiner* — Leon W Rhodes, Jr.
(74) *Attorney, Agent, or Firm* — CKC & Partners Co., LLC (57) ABSTRACT

A photography device includes a lens body, an inner housing, a light-transmissive cover, and an airtight member. The inner housing has an annular wall portion. The annular wall portion surrounds the lens body separately. The light-transmissive cover covers the lens body and the inner housing. The airtight member is disposed on the inner housing and includes a first annular abutting portion and a second annular abutting portion. The first annular abutting portion is airtightly abutted between the inner housing and the light-transmissive cover. The second annular abutting portion is airtightly abutted between the inner housing and the lens body.

13 Claims, 5 Drawing Sheets

PHOTOGRAPHY DEVICE

CROSS-REFERENCE TO RELATED APPLICATION

This application claims priority to Taiwan Application Serial Number 111150497, filed Dec. 28, 2022, which is herein incorporated by reference.

BACKGROUND

Technical Field

The disclosure relates to a photography device.

Description of Related Art

Existing image capture equipment usually uses cameras. In order to protect the lens on the camera, a transparent protective cover is usually installed on the front end of the lens. However, when the outside temperature and humidity change, water mist is easily generated on the protective cover, which greatly reduces the image capture quality. In the case of fogging, a traditional approach is to install a heating structure inside the protective cover to achieve the defogging effect. However, the traditional approach may make the structures inside the protective cover and the assembly procedures more complicated.

Accordingly, how to provide a photography device to solve the aforementioned problems becomes an important issue to be solved by those in the industry.

SUMMARY

An aspect of the disclosure is to provide a photography device that can efficiently solve the aforementioned problems.

According to an embodiment of the disclosure, a photography device includes a lens body, an inner housing, a light-transmissive cover, and an airtight member. The inner housing has an annular wall portion. The annular wall portion surrounds the lens body separately. The light-transmissive cover covers the lens body and the inner housing. The airtight member is disposed on the inner housing and includes a first annular abutting portion and a second annular abutting portion. The first annular abutting portion is airtightly abutted between the inner housing and the light-transmissive cover. The second annular abutting portion is airtightly abutted between the inner housing and the lens body.

In an embodiment of the disclosure, the annular wall portion has a top surface. The first annular abutting portion is airtightly abutted between the top surface and the light-transmissive cover.

In an embodiment of the disclosure, the airtight member further includes an outer extension portion. The outer extension portion is connected to the first annular abutting portion and covers an outer side surface of the annular wall portion.

In an embodiment of the disclosure, the annular wall portion has a recess located on the outer side surface. The outer extension portion includes a protrusion. The protrusion is engaged with the recess.

In an embodiment of the disclosure, the first annular abutting portion further includes an inner extension portion. The inner extension portion is connected between the first annular abutting portion and the second annular abutting portion and covers an inner side surface of the annular wall portion.

In an embodiment of the disclosure, the lens body has a central axis. The second annular abutting portion has a thickness in a direction parallel to the central axis. The thickness becomes smaller as approaching the central axis.

In an embodiment of the disclosure, the lens body has a sidewall and a flange protruding from the sidewall. The second annular abutting portion abuts against the sidewall. An inner diameter of the second annular abutting portion is smaller than an outer diameter of the flange.

In an embodiment of the disclosure, the lens body has a central axis. The flange is located between the light-transmissive cover and the second annular abutting portion in a direction parallel to the central axis.

In an embodiment of the disclosure, the lens body has a sidewall and an annular groove recessed from the sidewall. The second annular abutting portion is engaged with the annular groove.

In an embodiment of the disclosure, the second annular abutting portion is an O-ring.

In an embodiment of the disclosure, the photography device further includes a base and a pivotal member. The pivotal member is slidably engaged with the base and configured to rotate relative to the base around a rotation axis. The inner housing is rotatably connected to the pivotal member and configured to rotate relative to the pivotal member around another rotation axis.

In an embodiment of the disclosure, the inner housing further includes a lower housing. The lower housing and the annular wall portion are assembled to form an accommodating space. The airtight member at least covers a top surface and an outer side surface of the annular wall portion.

In an embodiment of the disclosure, the second annular abutting portion has an internal thread portion. The lens body has a sidewall. The sidewall has an external thread portion. The internal thread portion and the external thread portion are airtightly screwed together.

Accordingly, in the photography device of the disclosure, the airtight member disposed on the inner housing airtightly abuts against the light-transmissive cover and the lens body, so the airtight member can form a closed space between the light-transmissive cover and the lens body. Since this closed space is isolated from other internal spaces within the photography device, there is no connection to the outside world via the internal spaces. In this way, even if the outside temperature and humidity change, the outside water vapor cannot enter the aforementioned closed space and generate water mist.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the embodiments of the disclosure, examples of which are illustrated in the accompanying drawings. Wherever possible, the same reference numbers are used in the drawings and the description to refer to the same or like parts. However, specific structural and functional details disclosed herein are merely representative for purposes of describing example embodiments, and thus may be embodied in many alternate forms and should not be construed as limited to only example embodiments set forth herein. Therefore, it should be understood that there is no intent to limit example embodiments to the particular forms disclosed, but on the contrary, example embodiments are to cover all modifications, equivalents, and alternatives falling within the scope of the disclosure.

Figure 1A:
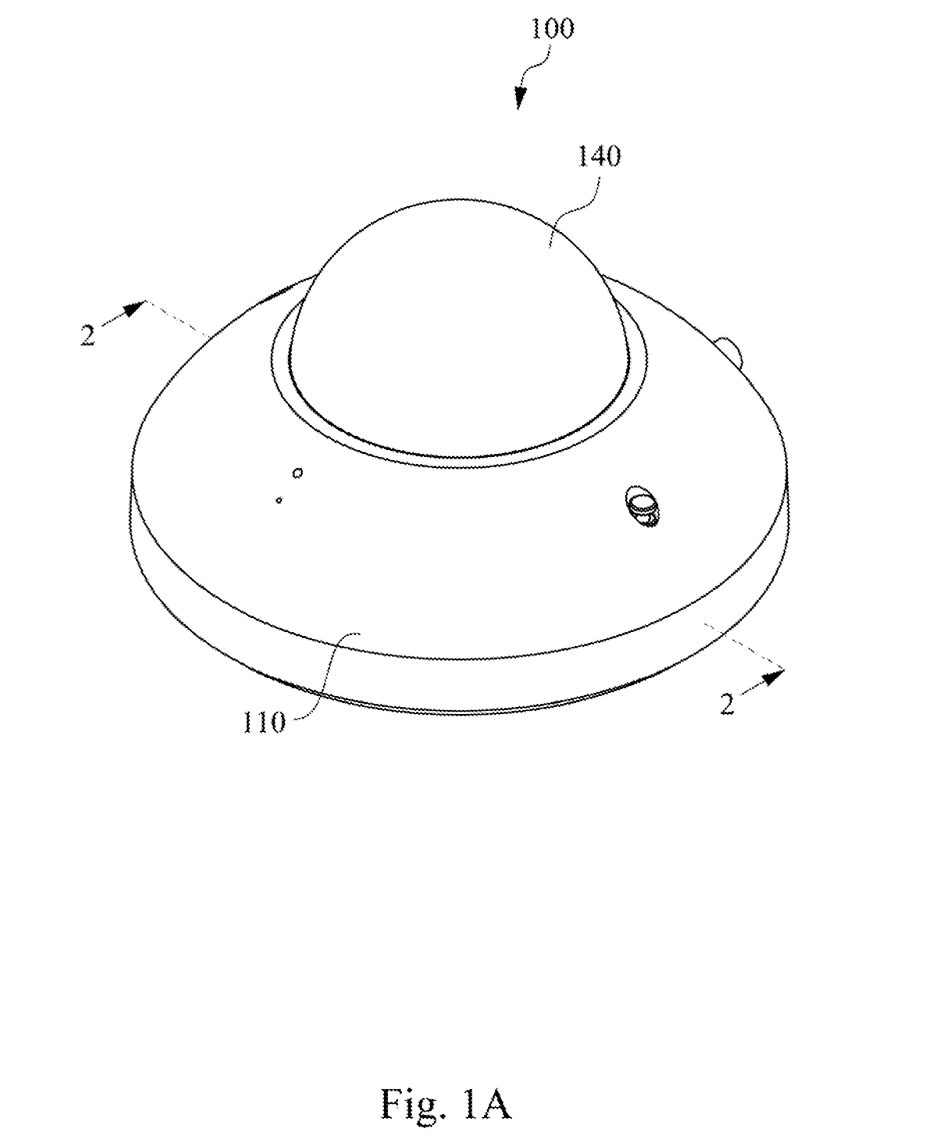
FIG. 1A is a perspective view of a photography device according to an embodiment of the disclosure.
Figure 1B:
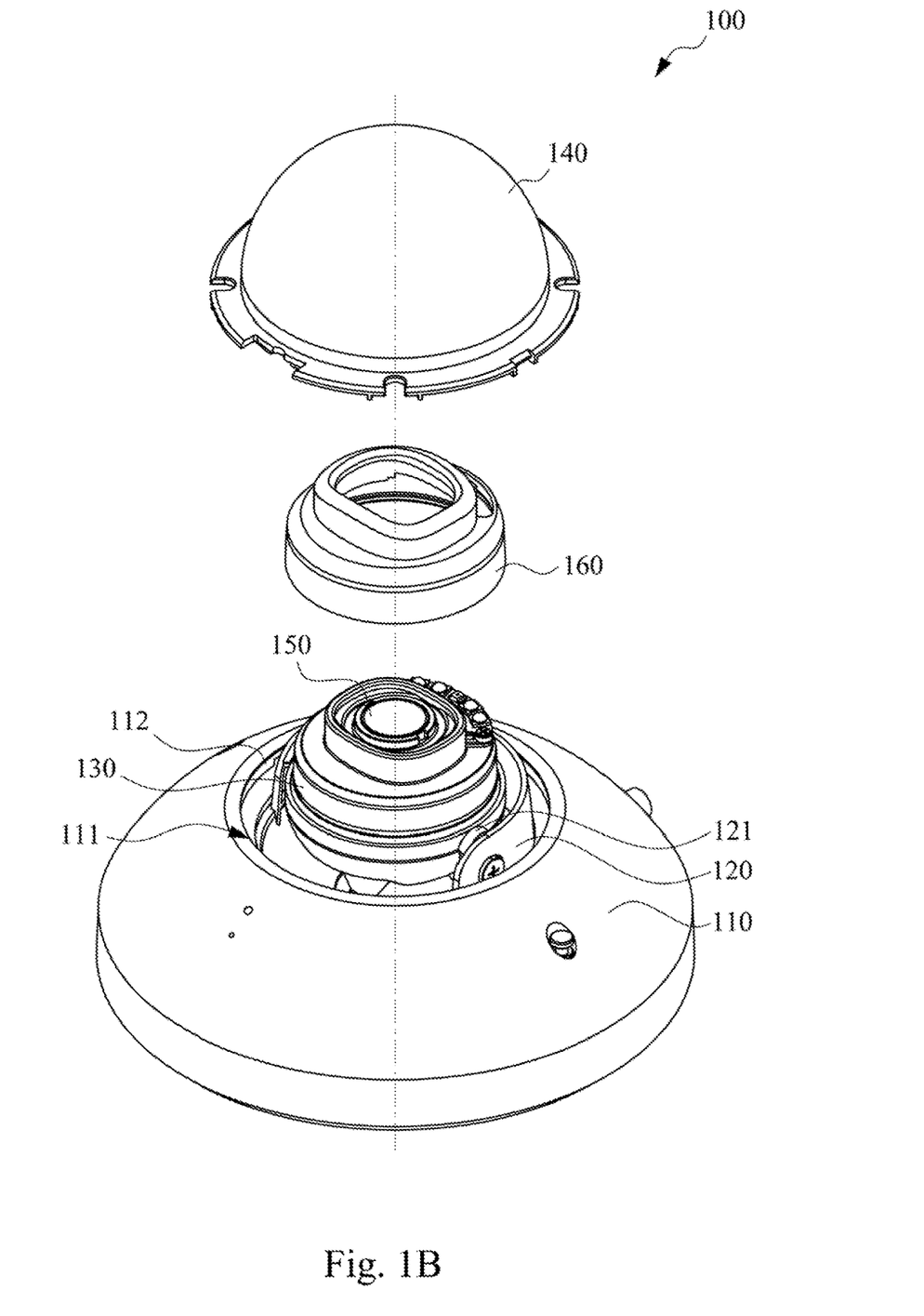
FIG. 1B is an exploded view of the photography device in FIG. 1A.

Reference is made to FIGS. 1A and 1B. FIG. 1A is a perspective view of a photography device 100 according to an embodiment of the disclosure. FIG. 1B is an exploded view of the photography device 100 in FIG. 1A. As shown in FIGS. 1A and 1B, in the embodiment, the photography device 100 includes a base 110, a pivotal member 120, an inner housing 130, a light-transmissive cover 140, a lens body 150, and an airtight member 160. The base 110 is configured to be assembled with the light-transmissive cover 140 to form a complete appearance of the photography device 100. That is, the pivotal member 120, the inner housing 130, the lens body 150, and the airtight member 160 are accommodated inside the photography device 100. In the embodiment, inner and outer surfaces of the light-transmissive cover 140 are curved surfaces, but the disclosure is not limited thereto. In practical applications, at least one of the inner and outer surfaces of the light-transmissive cover 140 may be flat.

As shown in FIG. 1B, in the embodiment, the base 110 has an opening 111. The pivotal member 120 is accommodated in the base 110 and is partially exposed through the opening 111. In some embodiments, an annular track 112 is provided on the inner surface of the base 110 along an edge of the opening 111. The pivotal member 120 is slidably engaged with the annular track 112, so as to rotate along the annular track 112. In detail, the pivotal member 120 is configured to rotate around a rotation axis RA1 passing through the center of the annular track 112 along the annular track 112. The annular track 112 is formed based on an annular trajectory. The rotation axis RA1 is defined by an axis perpendicular to the plane of the annular trajectory and passing through the center of the annular trajectory.

Figure 2:
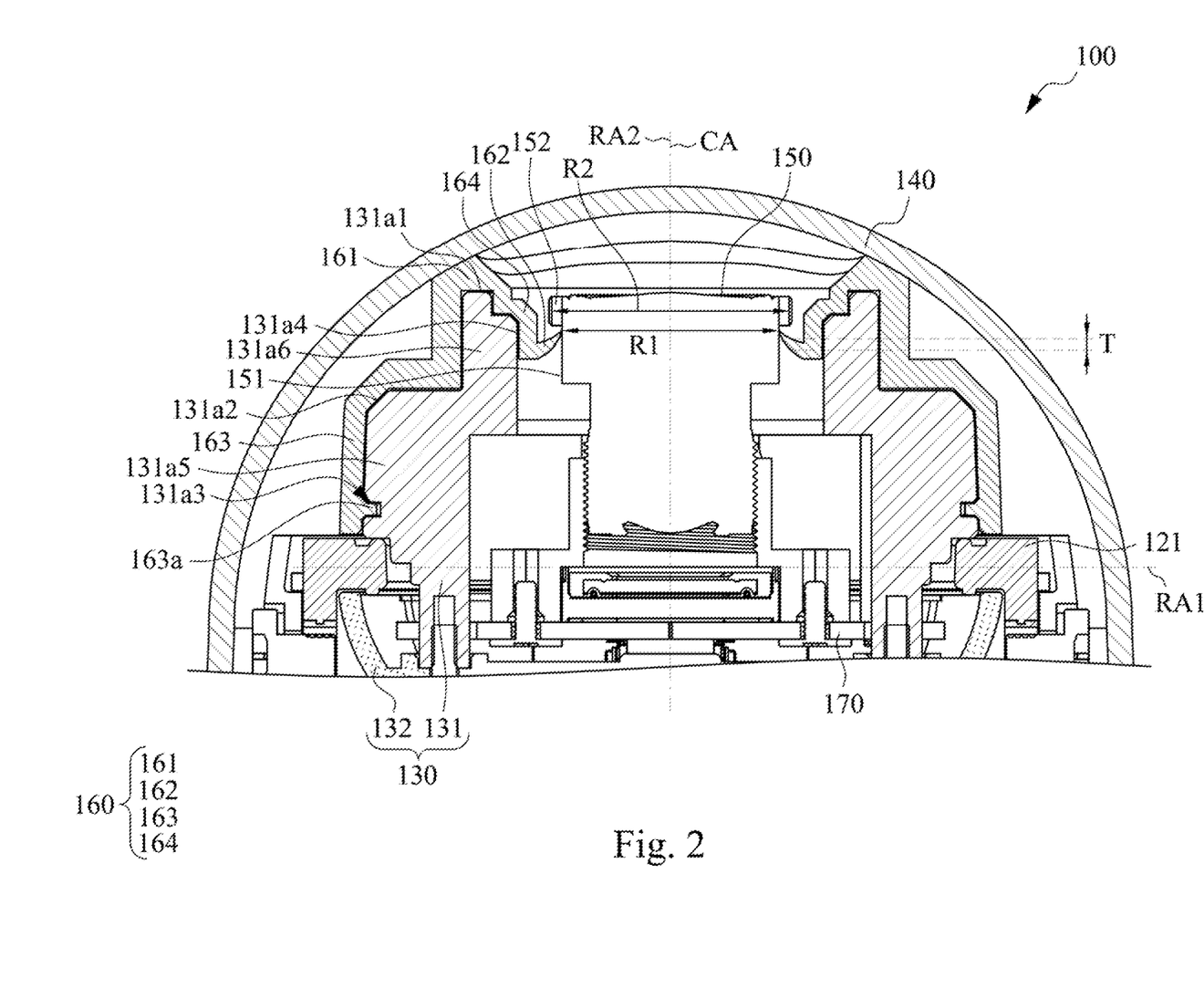
FIG. 2 is a partial cross-sectional view of the photography device in FIG. 1A taken along line 2-2.

Reference is made to FIG. 2. FIG. 2 is a partial cross-sectional view of the photography device 100 in FIG. 1A taken along line 2-2. As shown in FIGS. 1B and 2, in the embodiment, the inner housing 130 is rotatably connected to the pivotal member 120 and partially extends into the base 110 via the opening 111. Specifically, the pivotal member 120 has two pivot shafts 121. The two pivot shafts 121 are coaxial and pivotally connected to opposite sides of the inner housing 130 respectively. In this way, the inner housing 130 can rotate around the two pivot shafts 121. In detail, by being pivotally connected to the two pivot shafts 121, the inner housing 130 can rotate around a rotation axis RA2 passing through the two pivot shafts 121.

In some embodiments, the two pivot shafts 121 are parallel to the annular track 112, but the embodiment is not limited thereto. In some embodiments, the rotation axis RA1 and the rotation axis RA2 are substantially perpendicular to each other, but the disclosure is not limited thereto.

As shown in FIG. 2, in the embodiment, the lens body 150 is fixed to the inner housing 130 inside the inner housing 130. The lens body 150 has a central axis CA. For example, the lens body 150 includes a sleeve and a plurality of lenses (not shown). The lenses are sequentially arranged along the central axis CA and disposed in the sleeve. In some embodiments, the central axis CA of the lens body 150 can be defined by the optical axes of these lenses, but the disclosure is not limited thereto.

As shown in FIG. 2, the central axis CA of the lens body 150 coincides with the rotation axis RA1, but the disclosure is not limited thereto. By rotating the pivotal member 120 relative to the base 110 around the rotation axis RA2 and rotating the inner housing 130 relative to the pivotal member 120 about the rotation axis RA2, the central axis CA of the lens body 150 can be adjusted to pass anywhere on the concave surface of the light-transmissive cover 140.

As shown in FIG. 2, in the embodiment, the inner housing 130 includes an annular wall portion 131 and a lower housing 132. The annular wall portion 131 and the lower housing 132 are assembled to form an accommodating space. The two pivot shafts 121 of the pivotal member 120 are engaged between the annular wall portion 131 and the lower housing 132. The lens body 150 is fixed to at least one of the annular wall portion 131 and the lower housing 132 inside the inner housing 130. The annular wall portion 131 is communicated with the inner and outer spaces of the inner housing 130. The annular wall portion 131 surrounds the lens body 150 separately. The lens body 150 is exposed from the inner housing 130 via the annular wall portion 131. In this way, the lens body 150 can receive external light without being blocked by the inner housing 130.

As shown in FIG. 2, in the embodiment, the photography device 100 further includes a circuit board 170. The circuit board 170 is disposed inside the accommodating space of the inner housing 130. The circuit board 170 is provided with an image chip (not shown). The central axis CA of the lens body 150 passes through the image chip. In this way, external light can reach the image chip via the lens body 150, and the image chip can generate a captured image accordingly.

In some embodiments, the circuit board 170 is fastened on the annular wall portion 131 (e.g., by a screw lock structure), but the disclosure is not limited thereto. In some embodiments, the lens body 150 is fastened on the circuit board 170 (e.g., by a screw lock structure), and is fixed to the annular wall portion 131 through the circuit board 170, but the disclosure is not limited thereto.

As shown in FIGS. 1B and 2, in the embodiment, the airtight member 160 is disposed on the inner housing 130 and includes a first annular abutting portion 161 and a second annular abutting portion 162. The first annular abutting portion 161 is airtightly abutted between the inner housing 130 and the light-transmissive cover 140. The second annular abutting portion 162 is airtightly abutted between the inner housing 130 and the lens body 150. With the structural configurations, the airtight member 160 can form a closed space between the light-transmissive cover 140 and the lens body 150. Since this closed space is isolated from other internal spaces within the photography device 100, there is no connection to the outside world via the internal spaces. In this way, even if the outside temperature and humidity change, the outside water vapor cannot enter the aforementioned closed space and generate water mist.

In some embodiments, the airtight member 160 is made of an elastic material. In some embodiments, the material of the airtight member 160 includes rubber, but the disclosure is not limited thereto.

In detail, the annular wall portion 131 has a top surface 131a1. The first annular abutting portion 161 is airtightly abutted between the top surface 131a1 of the annular wall portion 131 and the light-transmissive cover 140. The second annular abutting portion 162 is airtightly abutted between an inner side surface 131a4 of the annular wall portion 131 and a sidewall 151 of the lens body 150.

As shown in FIG. 2, in the embodiment, the airtight member 160 further includes an outer extension portion 163. The outer extension portion 163 is connected to the first annular abutting portion 161 and covers an outer side surface 131a2 of the annular wall portion 131. In some embodiments, the outer extension portion 163 is configured to be fitly sleeved on the outer side surface 131a2 of the annular wall portion 131, thereby increasing the positioning convenience and stability of the assembly personnel when installing the airtight member 160 on the annular wall portion 131.

As shown in FIG. 2, in the embodiment, the annular wall portion 131 has a recess 131a3 located on the outer side surface 131a2. The outer extension portion 163 includes a protrusion 163a. The protrusion 163a is engaged with the recess 131a3. In this way, the fixation of the airtight member 160 on the annular wall portion 131 can be further enhanced, thereby effectively preventing the airtight member 160 from falling off from the annular wall portion 131.

As shown in FIG. 2, in the embodiment, the first annular abutting portion 161 further includes an inner extension portion 164. The inner extension portion 164 is connected between the first annular abutting portion 161 and the second annular abutting portion 162 and covers the inner side surface 131a4 of the annular wall portion 131. In some embodiments, the inner extension portion 164 is configured to be fitly sleeved on the inner side surface 131a4 of the annular wall portion 131, thereby increasing the positioning convenience and stability of an assembler when installing the airtight member 160 on the annular wall portion 131. In detail, when there are more surface contacts between the airtight member 160 and the annular wall portion 131 assembled to each other, the two will be less likely to slide relative to each other due to friction, thereby more effectively preventing the airtight member 160 from falling off the annular wall portion 131.

As shown in FIG. 2, in the embodiment, the annular wall portion 131 has an outer flange 131a5 and an inner flange 131a6. The outer flange 131a5 is located at the lower half of the annular wall portion 131 and protrudes outward relative to the outer side surface 131a2. The inner flange 131a6 is located at the upper half of the annular wall portion 131 and inwardly protrudes relative to the inner side surface 131a4. It can be seen from this that, as shown in FIG. 2, the annular wall portion 131 has an outer shape that is narrow at the top and wide at the bottom.

As shown in FIG. 2, in the embodiment, the second annular abutting portion 162 of the airtight member 160 has a thickness T in a direction parallel to the central axis CA of the lens body 150, and the thickness T becomes smaller as approaching the central axis CA. The smaller the thickness T of the second annular abutting portion 162, the easier it is to deform. In this way, when an assembler is assembling the airtight member 160 to the annular wall portion 131, the second annular abutting portion 162 slidably abuts against the sidewall 151 of the lens body 150 with an inner edge portion that has the smallest thickness T and is easily deformed. Therefore, the friction force between the second annular abutting portion 162 and the sidewall 151 of the lens body 150 can be reduced, thereby facilitating assembly.

In some embodiments, the thickness T of the second annular abutting portion 162 gradually decreases smoothly toward the central axis CA of the lens body 150, but the disclosure is not limited thereto.

As shown in FIG. 2, in the embodiment, the lens body 150 further has a flange 152 protruding from the sidewall 151. An inner diameter R1 of the second annular abutting portion 162 is smaller than an outer diameter R2 of the flange 152. Therefore, when an assembler assembles the airtight member 160 to the annular wall portion 131, the second annular abutting portion 162 will first be squeezed by the flange 152 to expand and deform, and then recover after passing through the flange 152 to abut against the sidewall 151 of the lens body 150. In other words, after the airtight member 160 is assembled to the annular wall portion 131, the flange 152 is located between the light-transmissive cover 140 and the second annular abutting portion 162 in a direction parallel to the central axis CA of the lens body 150. In this way, the flange 152 can limit the second annular abutting portion 162, thereby effectively preventing the airtight member 160 from being separated from the annular wall portion 131 and the lens body 150.

In some embodiments, the assembly process of the inner housing 130, the lens body 150, and the airtight member 160 of the photography device 100 at least includes: (1) fixing the lens body 150 to the circuit board 170; (2) fixing the circuit board 170 to the annular wall portion 131; (3) assembling the annular wall portion 131 and the lower housing 132; and (4) placing the airtight member 160 on the annular wall portion 131, so that the airtight member 160 is airtightly abutted between the annular wall portion 131 and the lens body 150. The airtight member 160 contacts and interferes with the inner housing 130 and the lens body 150 to prevent moisture from entering the interior of the inner housing 130 through the gap between the inner housing 130 and the lens body 150. This can prevent moisture from damaging the circuit board 170 disposed on the inner housing 130. As shown in FIG. 2, in the embodiment, the first annular abutting portion 161 and the second annular abutting portion 162 of the airtight member 160 are two parts of a unitary structure, but the disclosure is not limited thereto.

Figure 3:
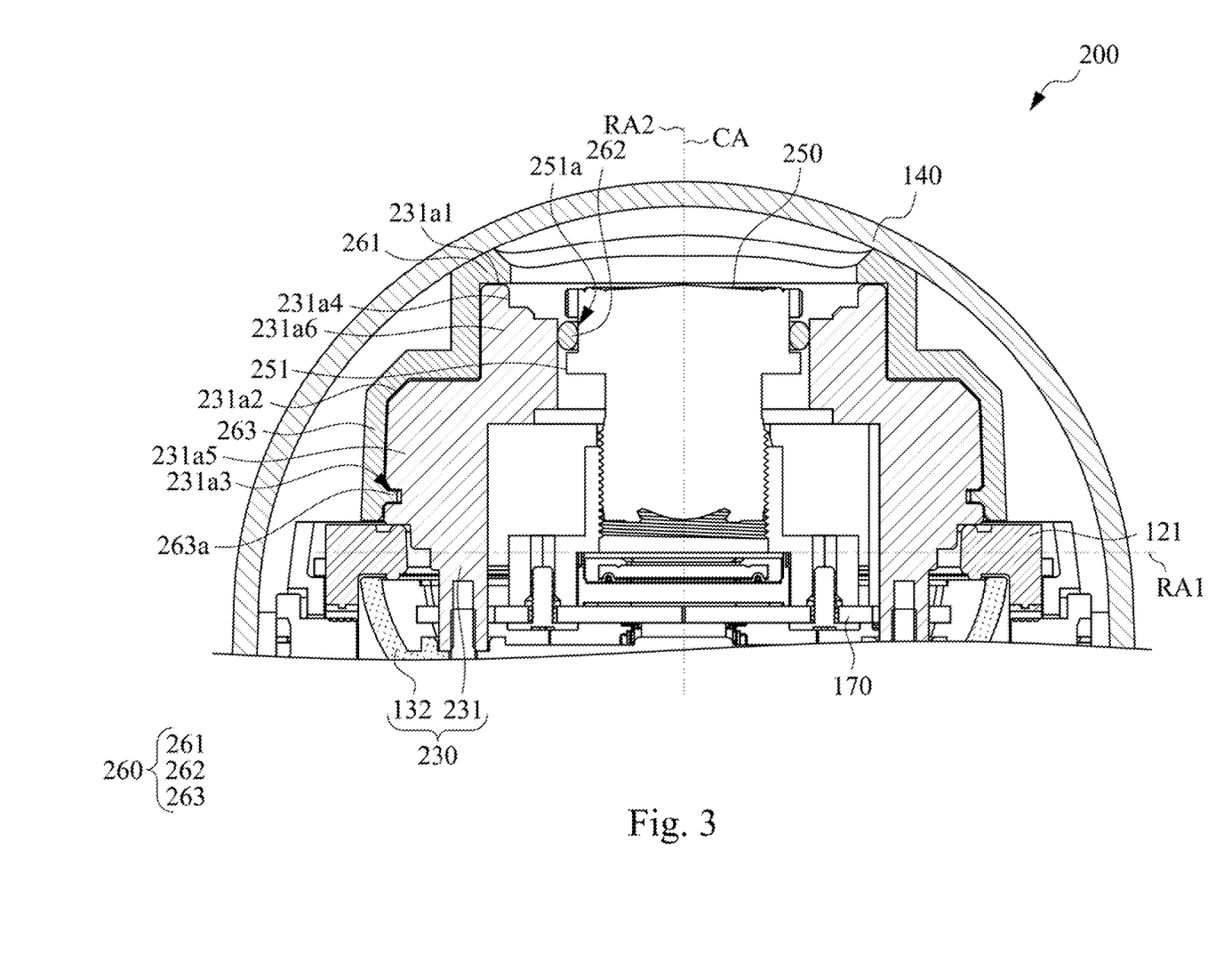
FIG. 3 is a partial cross-sectional view of a photography device according to another embodiment of the disclosure.

Reference is made to FIG. 3. FIG. 3 is a partial cross-sectional view of a photography device 200 according to another embodiment of the disclosure. As shown in FIG. 3, in the embodiment, the photography device 200 includes a base 110, a pivotal member 120 (with reference to FIG. 1B), an inner housing 230, a light-transmissive cover 140, a lens body 250, an airtight member 260, and a circuit board 170, in which the base 110, the pivotal member 120, the light-transmissive cover 140, and the circuit board 170 are identical to those of the embodiment as shown in FIG. 2, so reference can be made to the relevant explanations mentioned above and will not be described here again. The embodiment provides the modified inner housing 230, lens body 250, and airtight member 260.

Furthermore, as shown in FIG. 3, in the embodiment, the inner housing 230 includes an annular wall portion 231 and a lower housing 132, in which the lower housing 132 is identical to that of the embodiment shown in FIG. 2. The annular wall portion 231 has a top surface 231a1, an outer side surface 231a2 and an inner side surface 231a4 respectively connected to the outer and inner edges of the top surface 231a1, an outer flange 231a5 protruding outward from the lower half of the outer side surface 231a2, and an inner flange 231a6 protruding inward from the upper half of the inner side surface 231a4. Compared with the embodiment shown in FIG. 2, the inner side surface 231a4 of the annular wall portion 231 of the embodiment is closer to the sidewall 251 of the lens body 250.

As shown in FIG. 3, in the embodiment, the airtight member 260 includes a first annular abutting portion 261, a second annular abutting portion 262, and an outer extension portion 263. The first annular abutting portion 261 is airtightly abutted between the top surface 231a1 of the annular wall portion 231 and the light-transmissive cover 140. The outer extension portion 263 is connected to the first annular abutting portion 261 and covers the outer side surface 231a2 of the annular wall portion 231. The annular wall portion 231 has a recess 231a3 located on the outer side surface 231a2. The outer extension portion 263 includes a protrusion 263a engaged with the recess 231a3.

Compared with the embodiment shown in FIG. 2, the airtight member 260 of the embodiment omits the inner extension portion 164. Therefore, the first annular abutting portion 261 and the second annular abutting portion 262 of the embodiment are separated from each other. In other words, the airtight member 260 of the embodiment is a two-piece component.

In some embodiments, the second annular abutting portion 262 is an O-ring, but the disclosure is not limited thereto.

As shown in FIG. 3, in the embodiment, the lens body 250 has an annular groove 251a recessed from the sidewall 251. The second annular abutting portion 262 is engaged with the annular groove 251a. In this way, even if the second annular abutting portion 262 is not connected to the first annular abutting portion 261, the second annular abutting portion 262 can still be positioned by being accommodated in the annular groove 251a.

Figure 4:
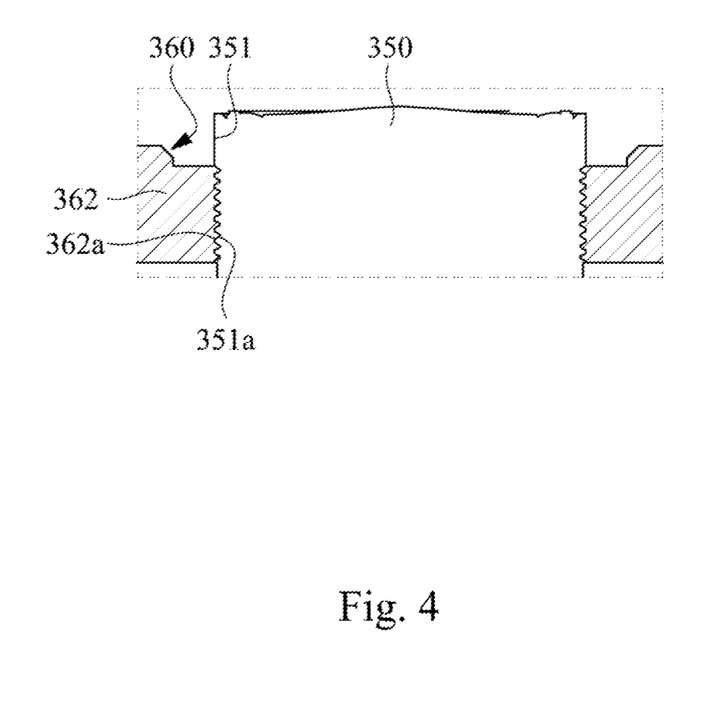
FIG. 4 is a partial cross-sectional view of a lens body and an airtight member according to another embodiment of the disclosure.

Reference is made to FIG. 4. FIG. 4 is a partial cross-sectional view of a lens body 350 and an airtight member 360 according to another embodiment of the disclosure. Compared with the embodiment shown in FIG. 2, the embodiment provides the modified lens body 350 and airtight member 360, especially modifications to a sidewall 351 of the lens body 350 and the second annular abutting portion 362 of the airtight member 360. Specifically, as shown in FIG. 4, the second annular abutting portion 362 has an internal thread portion 362a. The sidewall 351 of the lens body 350 has an external thread portion 351a. The internal thread portion 362a of the second annular abutting portion 362 and the external thread portion 351a of the lens body 350 are airtightly screwed together. Through the multi-layer staggered stacking structure between the internal thread portion 362a and the external thread portion 351a, the airtightness between the second annular abutting portion 362 and the lens body 350 can be further improved.

According to the foregoing recitations of the embodiments of the disclosure, it can be seen that in the photography device of the disclosure, the airtight member disposed on the inner housing airtightly abuts against the light-transmissive cover and the lens body, so the airtight member can form a closed space between the light-transmissive cover and the lens body. Since this closed space is isolated from other internal spaces within the photography device, there is no connection to the outside world via the internal spaces. In this way, even if the outside temperature and humidity change, the outside water vapor cannot enter the aforementioned closed space and generate water mist.

Although the disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims.

What is claimed is:

1. A photography device, comprising:
a lens body;
an inner housing having an annular wall portion, the annular wall portion surrounding the lens body separately;
a light-transmissive cover covering the lens body and the inner housing; and
an airtight member disposed on the inner housing and comprising a first annular abutting portion and a second annular abutting portion, wherein the first annular abutting portion is airtightly abutted between the inner housing and the light-transmissive cover, and the second annular abutting portion is airtightly abutted between the inner housing and the lens body.

2. The photography device of claim 1, wherein the annular wall portion has a top surface, and the first annular abutting portion is airtightly abutted between the top surface and the light-transmissive cover.

3. The photography device of claim 2, wherein the airtight member further comprises an outer extension portion, and the outer extension portion is connected to the first annular abutting portion and covers an outer side surface of the annular wall portion.

4. The photography device of claim 3, wherein the annular wall portion has a recess located on the outer side surface, the outer extension portion comprises a protrusion, and the protrusion is engaged with the recess.

5. The photography device of claim 3, wherein the first annular abutting portion further comprises an inner extension portion, and the inner extension portion is connected between the first annular abutting portion and the second annular abutting portion and covers an inner side surface of the annular wall portion.

6. The photography device of claim 1, wherein the lens body has a central axis, the second annular abutting portion has a thickness in a direction parallel to the central axis, and the thickness becomes smaller as approaching the central axis.

7. The photography device of claim 1, wherein the lens body has a sidewall and a flange protruding from the sidewall, the second annular abutting portion abuts against the sidewall, and an inner diameter of the second annular abutting portion is smaller than an outer diameter of the flange.

8. The photography device of claim 7, wherein the lens body has a central axis, and the flange is located between the light-transmissive cover and the second annular abutting portion in a direction parallel to the central axis.

9. The photography device of claim 1, wherein the lens body has a sidewall and an annular groove recessed from the sidewall, and the second annular abutting portion is engaged with the annular groove.

10. The photography device of claim 1, wherein the second annular abutting portion is an O-ring.

11. The photography device of claim 1, further comprising:
- a base; and
- a pivotal member slidably engaged with the base and configured to rotate relative to the base around a rotation axis,
- wherein the inner housing is rotatably connected to the pivotal member and configured to rotate relative to the pivotal member around another rotation axis.

12. The photography device of claim 1, wherein the inner housing further comprises a lower housing, the lower housing and the annular wall portion are assembled to form an accommodating space, wherein the airtight member at least covers a top surface and an outer side surface of the annular wall portion.

13. The photography device of claim 1, wherein the second annular abutting portion has an internal thread portion, the lens body has a sidewall, the sidewall has an external thread portion, and the internal thread portion and the external thread portion are airtightly screwed together.

* * * * *